J. F. ROBERTS.
ELECTRIC HEATER.
APPLICATION FILED MAR. 22, 1921.
1,403,639.
Patented Jan. 17, 1922
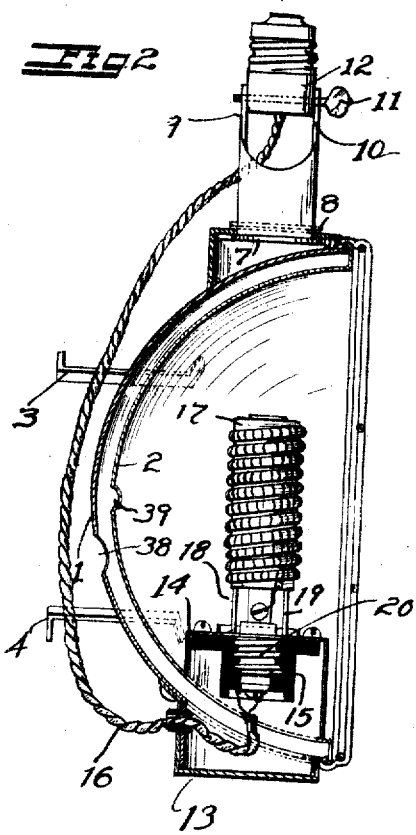
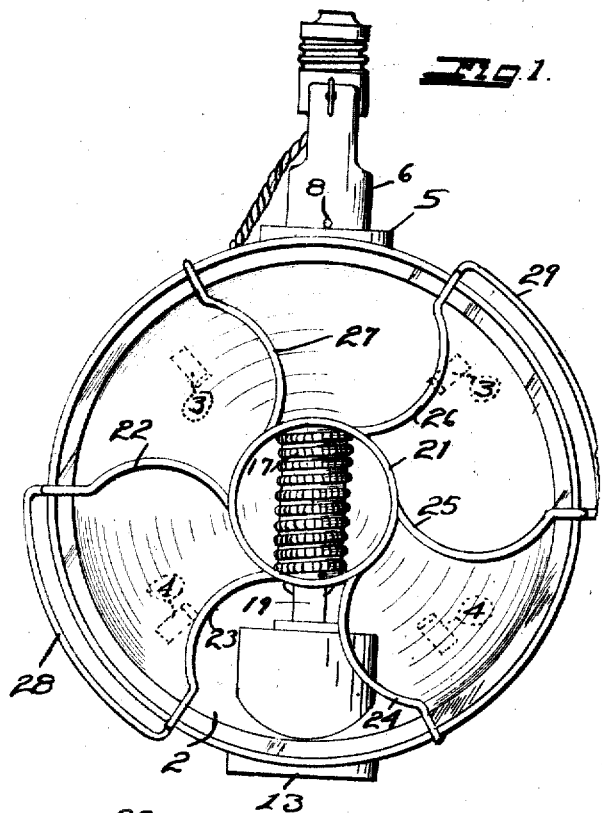
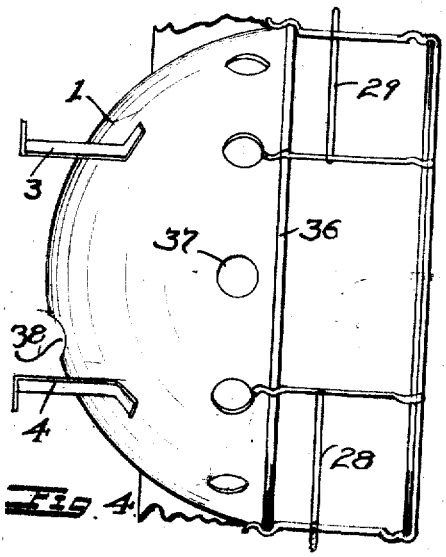
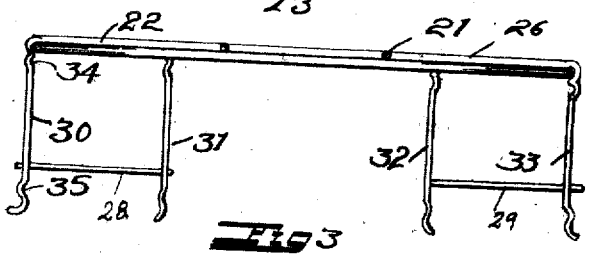
INVENTOR.
Joseph F. Roberts
BY
Carlos P. Griffin
ATTORNEY.

UNITED STATES PATENT OFFICE.

JOSEPH F. ROBERTS, OF SAN FRANCISCO, CALIFORNIA.

ELECTRIC HEATER.

1,403,639.  Specification of Letters Patent.  Patented Jan. 17, 1922.

Application filed March 22, 1921. Serial No. 454,571.

*To all whom it may concern:*

Be it known that I, JOSEPH F. ROBERTS, a citizen of the United States, residing at San Francisco, in the county of San Francisco, State of California, have invented a new and useful Electric Heater, of which the following is a specification in such full and clear terms as will enable those skilled in the art to construct and use the same.

This invention relates to an electrical heater and its object is to produce a heater which is capable of being used for a number of purposes.

One object of the invention is to produce a heater capable of being rotated to any desired position, which is light enough to be suspended from the ordinary wall socket.

Another object of the invention is to provide a base for the heater, which will permit it to be set up upon a table or other surface with the beam of reflected heat or light, in case a lamp is used in place of the heater, extending horizontally, and also to provide the heater with legs whereby it may be turned down flat, in order that it may be used for cooking purposes in connection with the heater.

Another object of the invention is to provide a socket in the heater which will enable a lamp or a heating element to be interchanged.

Another object of the invention is to provide the reflector with double walls, so that there is no danger of any person being burned, should he come in contact with the body of the reflector.

A further object of the invention is to provide a guard, which is capable of being held at a suitable distance from the reflector to prevent clothing or any other thing accidently coming in contact with the heating element, but which guard is capable of being moved down close to the heater coil when the heater is to be used for cooking purposes.

In the drawings in which the same reference numeral is applied to the same portions throughout the several views, Fig. 1 is a front elevation of the complete heater.

Fig. 2 is a vertical sectional view of the complete heater.

Fig. 3 is a side elevation of the guard detached from the heater, and

Fig. 4 is a side elevation of the heater showing the guard in the position to protect the heating element from accidental contact therewith of clothing or curtains.

The heater comprises the reflecting shades 1 and 2 connected together at their edges and spaced from each other far enough to produce an air space which will prevent the shell from becoming hot enough to burn anything brought in contact therewith.

The outer shell is provided with a plurality of legs 3 and 4, which enable the heater to be set up on a flat surface with the edge of the reflector shell horizontal.

At the top of shell 1 there is a casing 5, which is secured thereto over a thimble 6. The thimble 6 has a flange 7 within the casing 5 to support the latter and there is a pin 8 which holds the thimble closely in contact with the casing 5, while permitting it to be partially rotated at will.

The thimble 6 has two ears 9 and 10 and a thumb screw 11 which enables the ears to be thrown upon the screw plug 12 while permitting the thimble to be moved with respect thereto.

At the bottom of the shell 1 there is a box like casing 13 which affords a base for the heater to be stood up, in the position shown in Figure 2, upon a flat surface, and within the shell there is a casing 14 which supports a socket 15, to which the electric wires carried by the cable 16 are connected.

The heating element consists of a well known form of spirally wound resisting wire on an insulating cylinder 17. This cylinder has two legs 18 and 19 connected therewith, which are in turn connected to the screw plug 20, which plug is screwed into the socket 15 and may be removed therefrom when it is desired to substitute a lamp in the place of the heating element.

The guard consists of a wire circle 21 connected to a plurality of curved outwardly extending arms 22 to 27 inclusive. Two pairs of said arms are connected together, as indicated at 28 and 29 and all of the arms extend at right angles to the circle 21 at their outer ends, as indicated at 30 and 33 in Figure 3.

The arms 30 to 33 are all provided with two crimped portions 34 and 35 in order to hold to the guard in either of two positions, that is in the position shown in Figure 2 when the guard is close to the heating element, or in a position shown in Figure 4, in which the guard is shown in its outermost position with the ends of the legs 30 to 33 engaging the bottom 36 of the heater shell. The outer heater shell is provided with a plurality of openings 37 in order to permit the escape of heated air from the space between the two shells, and it also has an opening 38 near its center adjacent to opening 39 formed in the inner shell 2 to permit the escape of water or other liquid which happens to fall into the shell 2.

I claim—

1. An electric heater comprising the combination of a reflector, a socket plug for supporting the reflector on which it may be rotated, a detachable heating element carried by the reflector, and a guard frame having means to secure it in different positions with respect to the heater.

2. An electric heater comprising a reflector, means to support the reflector with its bowl horizontal or vertical, a socket plug to which the reflector is movably connected, a heating element in the reflector, and a guard frame having means to secure it to the reflector in either of two positions.

3. An electric heater of the class described consisting of a reflector, a socket plug, means to connect the plug to the reflector to allow it to be turned on two axes, a heating element detachably connected to the reflector, and a flat guard frame having means to secure it to the reflector in different positions.

4. An electric heater of the class described comprising a reflector, legs to support the reflector with its edge horizontal, and a guard having legs to hold it in different positions with respect to the reflector.

In testimony whereof I have hereunto set my hand this 10"day of March, A. D. 1921.

JOSEPH F. ROBERTS.